United States Patent [19]

Price

[11] Patent Number: 5,074,701
[45] Date of Patent: Dec. 24, 1991

[54] CONNECTOR SYSTEM FOR STORE FIXTURES

[75] Inventor: Jack E. Price, Joplin, Mo.

[73] Assignee: Lozier Corporation, Omaha, Nebr.

[21] Appl. No.: 661,506

[22] Filed: Feb. 26, 1991

[51] Int. Cl.⁵ .............................................. B25G 3/00
[52] U.S. Cl. .................................... 403/237; 403/234; 403/255
[58] Field of Search ............... 403/252, 255, 237, 234, 403/246, 191, 190, 196, 194, 201

[56] References Cited

U.S. PATENT DOCUMENTS

| | | | |
|---|---|---|---|
| 2,557,766 | 6/1951 | Ronfeldt | 403/237 |
| 4,391,545 | 7/1983 | Zummer | 403/246 X |
| 4,923,322 | 5/1990 | Burg | 403/190 X |

FOREIGN PATENT DOCUMENTS

| | | | |
|---|---|---|---|
| 666326 | 8/1964 | Italy | 403/190 |
| 958706 | 5/1964 | United Kingdom | 403/201 |

Primary Examiner—Andrew V. Kundrat
Attorney, Agent, or Firm—Zarley, McKee, Thomte, Voorhees & Sease

[57] ABSTRACT

A connector system for store fixtures comprising an elongated connector which is extended through a tubular member in one component of the store fixture and which is yieldably received by a tubular member in a second component of the fixture.

5 Claims, 4 Drawing Sheets

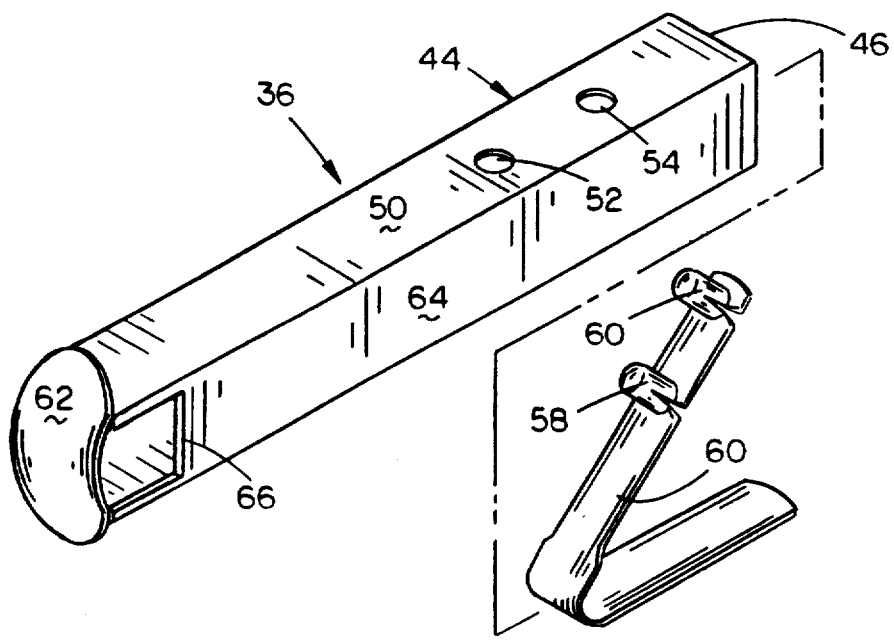
FIG. 3
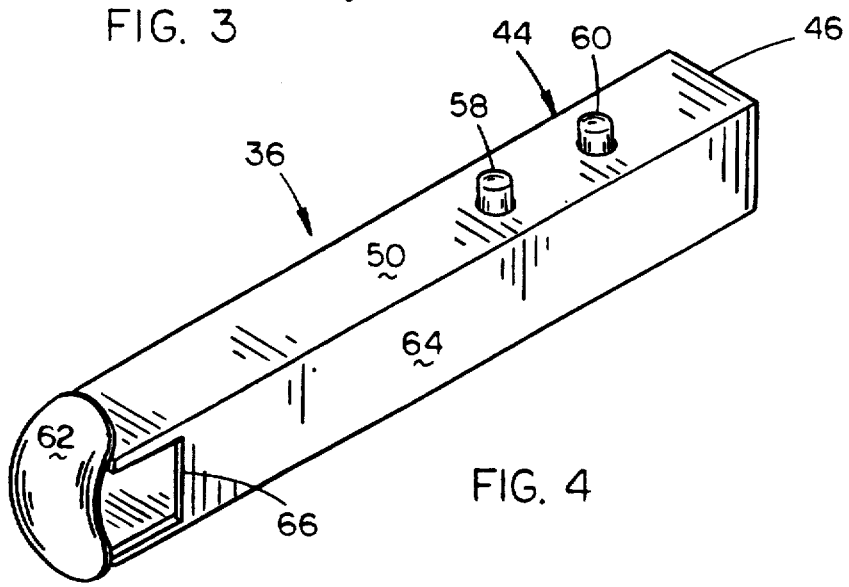
FIG. 4
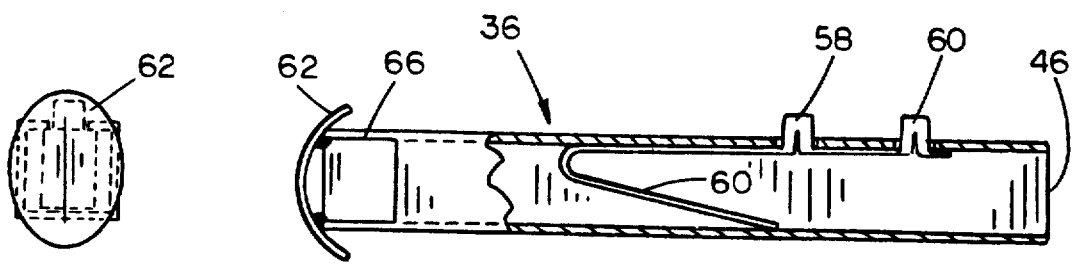
FIG. 5
FIG. 6

CONNECTOR SYSTEM FOR STORE FIXTURES

BACKGROUND OF THE INVENTION

This invention relates to a connector system for store fixtures, and more particularly to a connector system for store fixtures comprised of individual components which can be assembled together at the store site.

Store fixtures comprised of individual components or sections including tubular members have been in use for many years. For example, a commonly used store fixture is one which is comprised of a vertically disposed center frame having a pair of end frames disposed transversely thereto and secured thereto. The end frames and center frame are normally shipped from the factory to the customer unassembled and are assembled at the store location. During such assembly, the tubular members of the end frames are secured to the tubular members of the center frame.

Although the tubular store fixtures may take many shapes, most systems utilize similar connectors to secure the components together. The most common method of connecting the tubes in the fixtures is a bolt-together design utilizing a threaded fastener and a tapped welded-in insert. A variation of this design utilizes a push-in tapped insert. In both of the systems described hereinabove, screws are extended through one tubular member and threadably secured to the threaded insert member positioned in the tubular member of the other fixture component. Yet another design commonly used to secure tubular store fixtures together is an external clamp means which clamps around the tubular members.

A disadvantage of the above designs is the loose hardware which must be shipped and the handtools required to assemble the fixtures. The hardware may become lost due to small size thereof either during shipment or on the job site. Further, the threaded hardware also has a tendency to loosen over time if not properly tightened. Such retightening process requires handtools which retail store employees may not possess.

In an effort to avoid the shortcomings of the three fastening systems described hereinabove, applicant's assignee has utilized a design, such as illustrated in FIG. 2 of the patent drawings, which included a welded-on connector tube slidably received by a mating tube and which is retained therein by a spring button. The design of FIG. 2, although eliminating the loose hardware and loosening problems, creates another problem. The connector tube, welded on during production, protrudes at right angles from the frame. This causes difficulty in stacking and handling in the fabrication shop and requires the shipping carton to be vastly oversized to accommodate the connector. This, of course, adds cost to the product which does not benefit the customer. Further, the protruding connector is prone to shipping damage. If the connector is bent even slightly, it will not slide into the mating frame tube.

It is therefore a principle object of the invention to provide an improved connector system for store fixtures.

Yet another object of the invention is to provide a connector system for store fixtures which eliminates the need for small loose hardware and handtools.

Still another object of the invention is to provide a connector system for store fixtures which eliminates the shortcomings of the prior art.

Still another object of the invention is to provide a connector system for store fixtures which permits more efficient production, lower shipping costs and higher quality due to less shipping damage.

Still another object of the invention is to provide a connector system which is easy to use and which permits the rapid assembly of the fixtures.

BRIEF DESCRIPTION OF THE DRAWINGS

FIG. 3 is an exploded perspective view of the connector employed in the system of the inventor;

FIG. 4 is a perspective view of the connector of FIG. 3;

FIG. 5 is an end elevational view of the connector of FIG. 4;

FIG. 6 is a partial longitudinal sectional view of the connector of FIG. 4;

SUMMARY OF THE INVENTION

A connector system is described for securing together the components of a store fixture which may include for example an intermediate frame and a pair of end frames secured to the opposite ends thereof. The intermediate frame includes a pair of upper and lower tubular members which are horizontally disposed and which have open outer ends. Each of the end frames include horizontally disposed upper and lower tubular members which are positioned adjacent the upper and lower tubular members of the intermediate frame and which are disposed transversely with respect thereto. The tubular members of each of the end frames have square openings formed therein which register with the open ends of the tubular members of the intermediate frame. A connector is extended through each of the square openings in the tubular members of the end frames and is received within the open ends of the tubular members of the intermediate frame. The inner end of each of the connectors includes a two-button spring, with the protruding buttons thereof being received in openings formed in the tubular members of the intermediate frame. The outer end of each of the connectors preferably has an arcuate plate secured thereto which is closely positioned adjacent to the associated tubular member of the end frame and which has a shape closely corresponding to the shape of the associated tubular member adjacent to the opening formed therein.

DESCRIPTION OF THE PREFERRED EMBODIMENT

Figure 1:
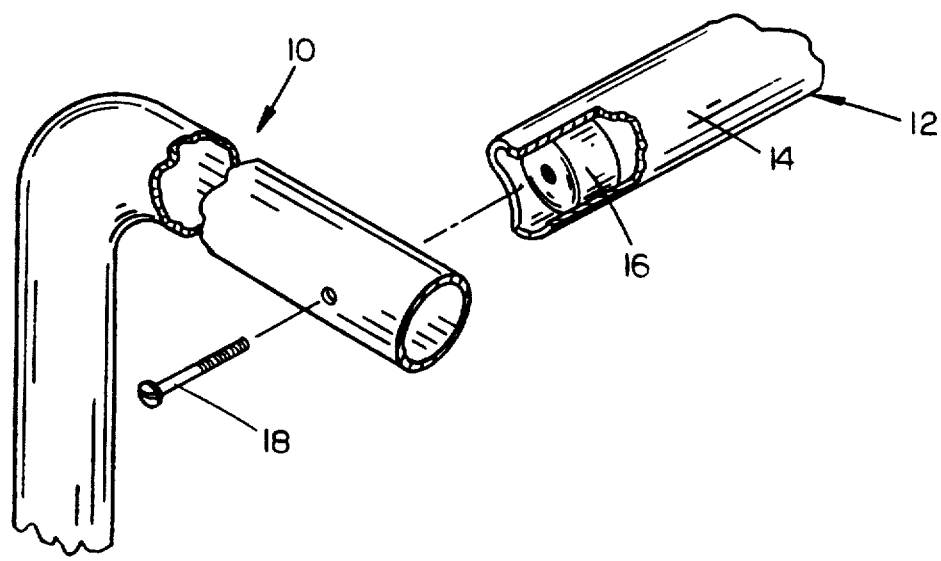
FIG. 1 is a partial perspective view of a connector system of the prior art.

FIG. 1 illustrates one prior art method of connecting a pair of store fixture components which one referred to generally by the reference numerals 10 and 12 respectively. Component 12 includes a tubular member 14 having a threaded insert 16 positioned therein which may either welded therein or pushed-in. Components 10 and 12 are connected by means of an elongated bolt 18 extending through openings formed in the component 10 and threadably received by the insert 16. The store fixture of FIG. 1 would be shipped from the factory to the store location in an unassembled condition and it is quite possible that the bolts could become lost during shipment. Further, during assembly of the store fixture, handtools are required. Additionally, the bolts of the connector system of FIG. 1 may become loose over a period of time which therefore would require further maintenance.

Figure 2:
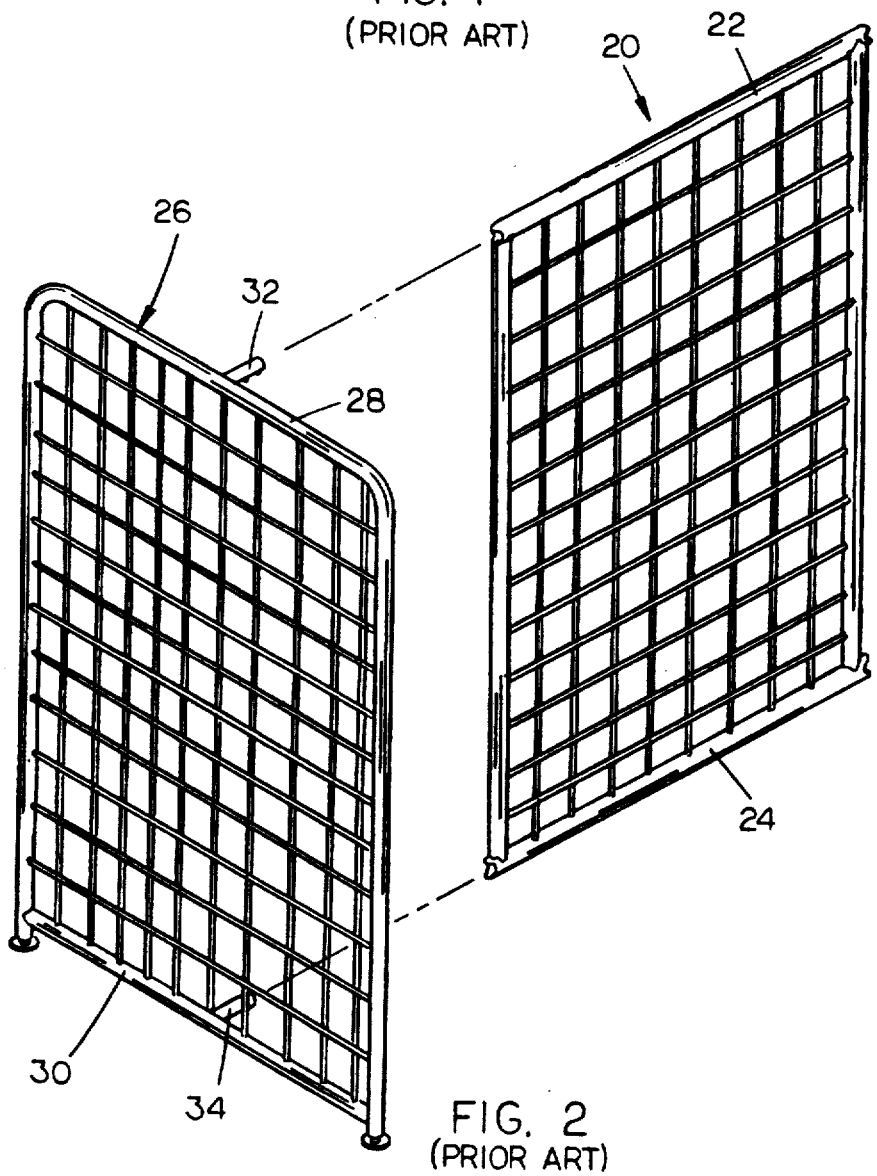
FIG. 2 is a partial perspective view of a connector system of the prior art.

The shortcomings of the FIG. 1 device were overcome by the connector system illustrated in FIG. 2 of the patent drawings. In FIG. 2, the numeral 20 refers to an intermediate frame having upper and lower tubular members 22 and 24 which have open outer ends. The numeral 26 refers to an end frame having upper and lower tubular members 28 and 30. Elongated connector tubes 32 and 34 are welded to the tubular members 28 and 30 respectively and extend therefrom for reception in the open outer ends of tubular members 22 and 24 respectively. The connectors 32 and 34 include a single two-button spring such as illustrated in FIGS. 3 and 4 to facilitate the connection of the frames 20 and 26. The problem associated with the connector system of FIG. 2 is that the protruding connectors 32 and 34 require that oversized shipping cartons be utilized. Further, the protruding connectors 32 and 34 frequently become bent during handling or shipment which makes their reception in the tubular members 22 and 24 impossible or very difficult. In any event, assembly or disassembly of the connector system described in FIG. 2 requires two people.

The shortcomings of the prior art are overcome by means of the connector system as illustrated in FIGS. 3-10. More particularly, the connector system of FIG. 2 is improved by eliminating the welded connectors 32 and 34 and replacing the same with selectively removable connectors which are referred to generally by the reference numerals 36 and 36′. Inasmuch as connectors 36′ are identical, only connector 36 will be described in detail.

Figure 7:
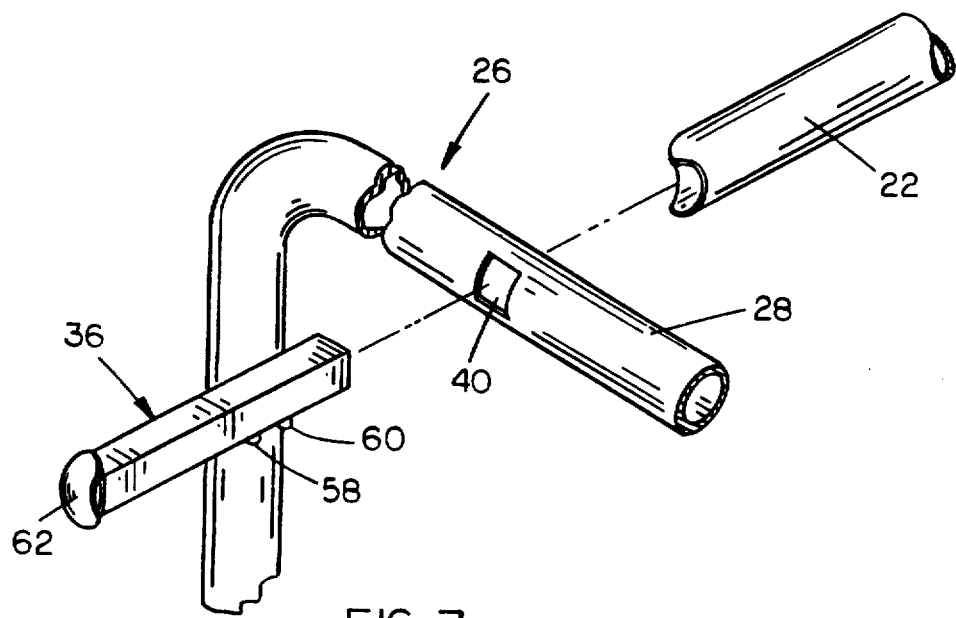
FIG. 7 is a perspective view of the connector system of this invention prior to connection thereof.
Figure 8:
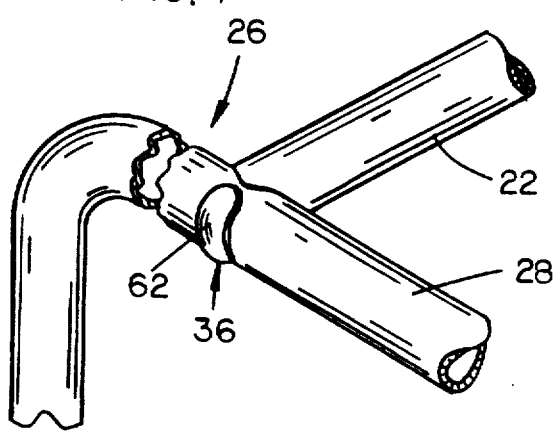
FIG. 8 is a perspective view of the connector system after connection thereof.
Figure 9:
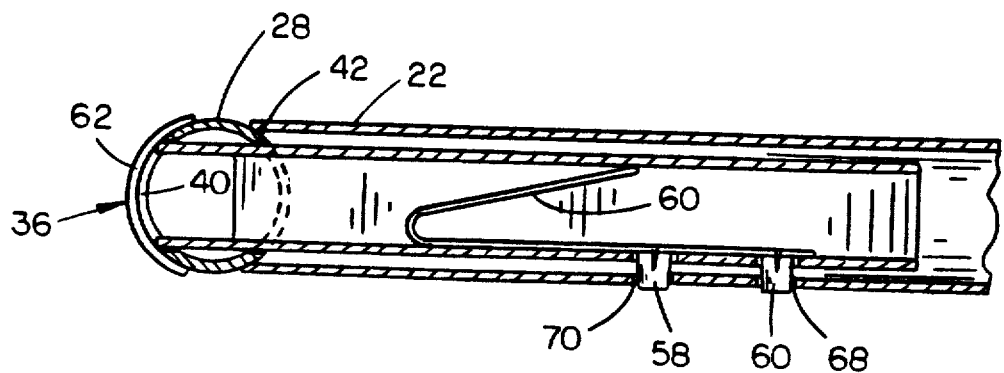
FIG. 9 is a longitudinal sectional view of the connector system after connection thereof.

As seen in FIG. 7, tubular member 28 of end frame 26 has been modified to eliminate the welded-on connector. A pair of square openings 40 and 42 are formed in tubular member 28 and they are adapted to receive connector 36 extending therethrough as illustrated in FIGS. 7 and 9. Connector 36 preferably has a square cross-section although other cross-sections would also work. Connector 36 includes an elongated body portion 44 including an inner end 46 and an outer end 48. The bottom 50 of body member 44 is provided with spaced-apart openings 52 and 54 through which the buttons 56 and 58 of spring 60 may protrude.

A formed cap 62 is welded to the outer end 48 of body member 44 and preferably has an oval configuration when viewed from the end as seen in FIG. 5. Preferably, cap 62 is arcuate when viewed from the side as seen in FIG. 6 so that the cap 62 will closely conform to the exterior surface of the tubular member 28 when the connector 36 is installed. Sidewall 64 of body member 44 is provided with an opening 66 formed at one end thereof to enable the cap 62 to be welded to the end of the body member 44 in the manner illustrated in FIG. 6.

Figure 10:
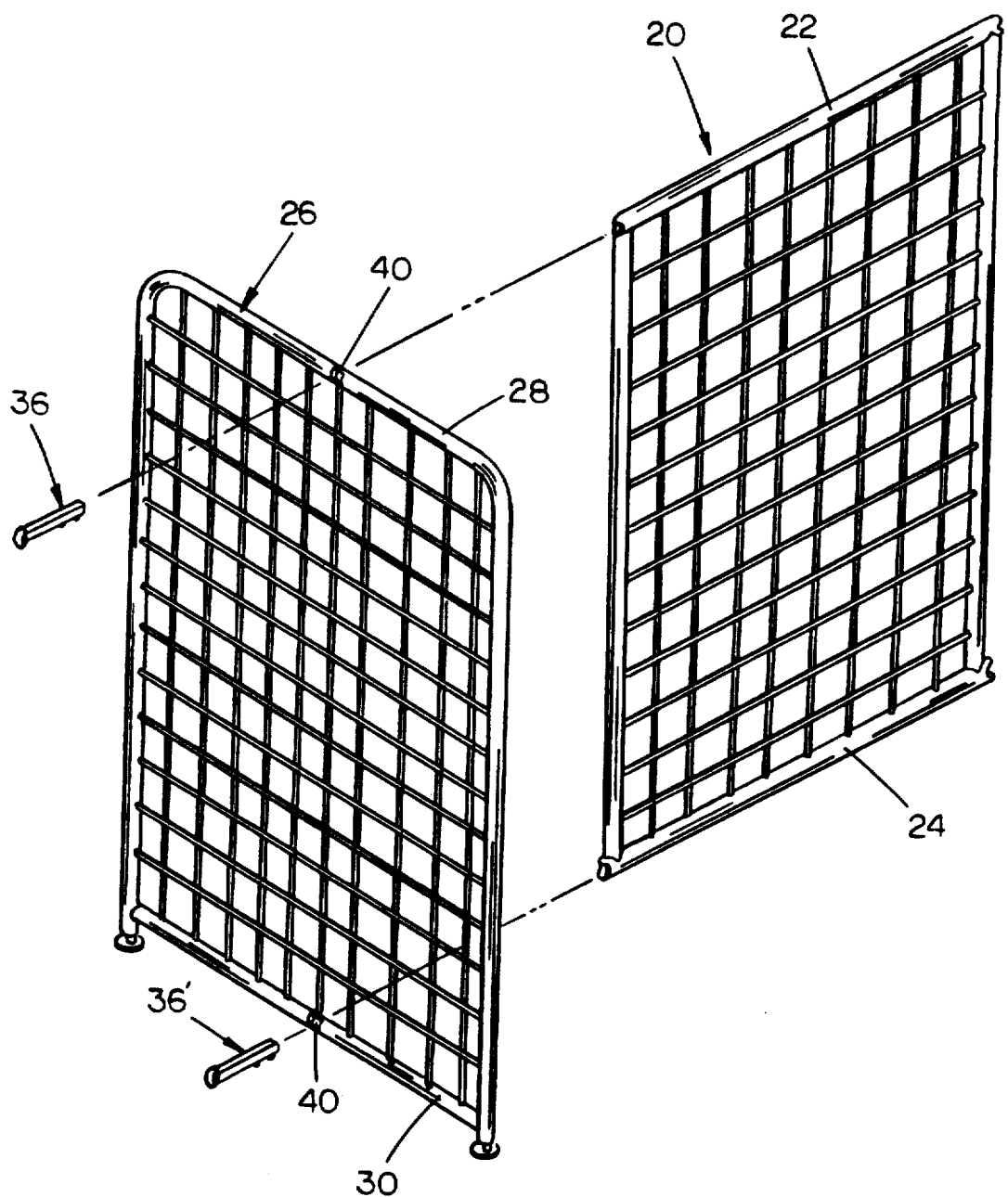
FIG. 10 is a perspective view similar to FIG. 2 except that the connector system of the invention is illustrated.

The fixture of FIG. 10 is assembled by first aligning the open ends of the tubular members 22 and 24 of the intermediate frame 20 with the square openings formed in tubular members 28 and 30. The connectors 36 and 36′ are then inserted through the square openings and received by the open ends of the tubular members 22 and 24 respectively. When the connectors 36 and 36′ have been completely extended into the open ends of the tubular members 22 and 24, the arcuate plate 62 will be closely positioned adjacent the exterior surface of the associated tubular member and will conform to the configuration thereof. When the connectors 36 and 36′ have been completely extended into the tubular members 22 and 24, the buttons 56 and 58 will be received by the openings 68 and 70 formed in the tubular member 22 or 24 to yieldably maintain the frames 20 and 26 in their assembled condition. It should be understood that in most cases, a second end frame would also be positioned at the other end of intermediate frame 20. Further, it should also be understood that the various store fixtures could have various configurations and the particular store fixture illustrated in FIG. 10 is for illustrative purposes only.

The connectors 36 and 36′ may be easily removed by one person from the fixture to permit the disassembly thereof. Thus, it can be seen that a novel connector system has been provided for store fixtures which eliminates the problems associated with the prior art. The protruding welded-on connectors of FIG. 2 have been eliminated as have the problems associated with the loose hardware of the prior art device such as illustrated in FIG. 1. It can therefore be seen that the invention accomplishes at least all of its stated objectives.

I claim:

1. In combination,
    a first display portion including at least a first substantially horizontally, disposed, elongated hollow tubular member having an open end portion,
    a second display portion including at least a second substantially horizontally, disposed elongated tubular member disposed adjacent said first tubular member and being disposed transversely, with respect thereto,
    said second tubular member having an opening extending therethrough which registers with the open end portion of said first tubular member,
    an elongated connector, having inner and outer ends, selectively removably extending through said opening in said second tubular member and into said open end portion of said first tubular member,
    said connector having a cap means secured to its outer end which has a dimension greater than said opening in said second tubular member,
    said cap means being in abutting engagement with said second tubular member and having a shape which conforms to the exterior shape of said second tubular member adjacent said opening and having inner and outer surfaces which are parallel to one another is as to maximize its conformance to the exterior shape of said second tubular member,
    and means selectively retaining said connector in said first tubular member to prevent the separation of said first and second tubular members of said first and second display portions respectively.

2. In combination,
    a first display portion including at least a first substantially horizontally, disposed, elongated hollow tubular member having an open end portion,
    a second display portion including at least a second substantially horizontally, disposed elongated tubular member disposed adjacent said first tubular member and being disposed transversely, with respect thereto, said second tubular member having an opening extending therethrough which registers with the open end portion of said first tubular member, an elongated connector, having inner and outer ends, selectively removably extending through said opening in said second tubular member and into said open end portion of said first tubular member, said connector having a cap means secured to its outer end which has a dimension greater than said opening in said second tubular member, said cap means being in abutting engagement with said second tubular member and having a shape which conforms to the exterior shape of said second tubular member adjacent said opening, and means selectively retaining said connector in said first tubular member to prevent the separation of said first and second tubular members of said first and second display portions respectively, said first and second tubular member being cylindrical, said opening in said second tubular member being square, said elongated connector having a square cross-section.

3. The combination of claim 2 wherein said cap means is oval shaped.

4. The combination of claim 3 wherein said cap means is arcuate to conform to the exterior shape of said second tubular member.

5. In combination, a first display portion including at least a first substantially horizontally, disposed, elongated hollow tubular member having an open end portion, a second display portion including at least a second substantially horizontally, disposed elongated tubular member disposed adjacent said first tubular member and being disposed transversely, with respect thereto, said second tubular member having an opening extending therethrough which registers with the open end portion of said first tubular member, an elongated connector, having inner and outer ends, selectively removably extending through said opening in said second tubular member and into said open end portion of said first tubular member, said connector having a cap means secured to its outer end which has a dimension greater than said opening in said second tubular member, said cap means being in abutting engagement with said second tubular member and having a shape which conforms to the exterior shape of said second tubular member adjacent said opening, and means selectively retaining said connector in said first tubular member to prevent the separation of said first and second tubular members of said first and second display portions respectively, said retaining means comprising a spring button means protruding therefrom which is received by an opening formed in said first tubular member.

* * * * *